(12) United States Patent
Sankaranaraynan et al.

(10) Patent No.: US 8,571,560 B1
(45) Date of Patent: Oct. 29, 2013

(54) SELECTING A WIRELESS ACCESS POINT BASED ON STATUS INFORMATION

(75) Inventors: Pallavur Sankaranaraynan, Overland Park, KS (US); Sean Alan Isaacson, Raymore, MO (US); Matthew C. Schlesener, Shawnee, KS (US); Brian D. Mauer, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 752 days.

(21) Appl. No.: 12/236,142

(22) Filed: Sep. 23, 2008

(51) Int. Cl.
*H04W 36/00* (2009.01)

(52) U.S. Cl.
USPC ............ 455/438; 455/525; 455/437; 370/337

(58) Field of Classification Search
USPC ........................... 455/435.1–435.2, 524–525; 370/331–332
See application file for complete search history.

(56) References Cited

U.S. PATENT DOCUMENTS

| | | | |
|---|---|---|---|
| 6,522,881 B1 | 2/2003 | Feder et al. | |
| 6,542,736 B1 * | 4/2003 | Parkvall et al. | 455/452.2 |
| 6,788,952 B1 * | 9/2004 | Jokimies et al. | 455/525 |
| 6,940,843 B2 | 9/2005 | Goodall et al. | |
| 7,191,247 B1 | 3/2007 | Philyaw | |
| 7,760,699 B1 * | 7/2010 | Malik | 370/342 |
| 2003/0083069 A1 * | 5/2003 | Vadgama | 455/436 |
| 2004/0039817 A1 * | 2/2004 | Lee et al. | 709/225 |
| 2004/0066759 A1 | 4/2004 | Molteni et al. | |
| 2004/0095906 A1 * | 5/2004 | Rajkotia | 370/332 |
| 2006/0203713 A1 * | 9/2006 | Laroia et al. | 370/209 |
| 2007/0091851 A1 | 4/2007 | Simonsson et al. | |
| 2007/0091864 A1 | 4/2007 | Honjo et al. | |
| 2007/0104128 A1 | 5/2007 | Laroia et al. | |
| 2007/0104164 A1 | 5/2007 | Laroia et al. | |
| 2007/0149132 A1 * | 6/2007 | Li et al. | 455/67.11 |
| 2007/0173208 A1 * | 7/2007 | Nishio et al. | 455/78 |
| 2007/0242643 A1 | 10/2007 | Chandra et al. | |
| 2007/0290924 A1 | 12/2007 | McCoy | |
| 2008/0280615 A1 * | 11/2008 | Vinayakray-Jani | 455/437 |

* cited by examiner

*Primary Examiner* — Kashif Siddiqui

(57) ABSTRACT

What is disclosed is a method of operating a wireless communication device. The method includes detecting a plurality of beacon signals, wherein each of the plurality of beacon signals is associated with each of a plurality of wireless access nodes. The method also includes receiving status information from each of the plurality of wireless access nodes, wherein the status information comprises a modulation level of a wireless link associated with each of the plurality of wireless access nodes. The method also includes selecting one of the plurality of wireless access nodes based on at least the modulation level of the wireless link associated with the one of the plurality of wireless access nodes, modulating user communications based on the modulation level of the wireless link associated with the selected one of the plurality of wireless access nodes, and exchanging the modulated user communications with the selected one of the plurality of wireless access nodes.

20 Claims, 8 Drawing Sheets

LIST OF BEACON SIGNALS DETECTED

| BTS | SERVICE PROVIDER | MODULATION LEVEL | FEC REDUNDANT BITS % | BEACON STRENGTH |
|---|---|---|---|---|
| 414 | SPRINT | QAM-16 | 10 % | 7 |
| 413 | SPRINT | QAM-64 | 46 % | 3 |
| 410 | VERIZON | ? | ? | 6 |
| 411 | VERIZON | ? | ? | 2 |
| 415 | AT&T | QAM-256 | ? | 1 |
| 417 | SPRINT | ? | 33% | 5 |
| 412 | AT&T | ? | ? | 8 |
| 416 | SPRINT | QAM-128 | 9 % | 4 |

500

SELECTED BTS 501

FIGURE 5

SELECTING A WIRELESS ACCESS POINT BASED ON STATUS INFORMATION

TECHNICAL FIELD

Aspects of the disclosure are related to the field of communications, and in particular, to selecting wireless access points in wireless communication networks.

TECHNICAL BACKGROUND

Wireless communication networks typically include wireless communication devices which, via a wireless communication system, communicate with further communication networks and equipment. The wireless communication system typically includes antennas, base stations, wireless access nodes, and other associated equipment to route communications over wireless links from the wireless communication devices to further communication networks, equipment, and destinations.

In order to establish communications with a wireless communication system, a wireless communication device typically monitors for beacon signals transmitted from base stations within the wireless communication system. A selection of base station is typically made based the highest signal strength beacon signal of a particular wireless service provider as determined by the wireless communication device. However, when many wireless communication devices select the same base station with the strongest beacon, overcrowding and possibly a lower quality of service can be introduced to those wireless communication devices communicating with the same base station.

Overview

What is disclosed is a method of operating a wireless communication device. The method includes detecting a plurality of beacon signals, wherein each of the plurality of beacon signals is associated with each of a plurality of wireless access nodes. The method also includes receiving status information from each of the plurality of wireless access nodes, wherein the status information comprises a modulation level of a wireless link associated with each of the plurality of wireless access nodes. The method also includes selecting one of the plurality of wireless access nodes based on at least the modulation level of the wireless link associated with the one of the plurality of wireless access nodes, modulating user communications based on the modulation level of the wireless link associated with the selected one of the plurality of wireless access nodes, and exchanging the modulated user communications with the selected one of the plurality of wireless access nodes.

What is also disclosed is a wireless communication device. The wireless communication device includes a communication interface configured to detect a plurality of beacon signals, wherein each of the plurality of beacon signals is associated with each of a plurality of wireless access nodes. The communication interface is also configured to receive status information from each of the plurality of wireless access nodes, wherein the status information comprises a modulation level of a wireless link associated with each of the plurality of wireless access nodes. The wireless communication device also includes a processing system configured to select one of the plurality of wireless access nodes based on at least the modulation level of the wireless link associated with the one of the plurality of wireless access nodes. The communication interface is also configured to modulate user communications based on the modulation level of the wireless link associated with the selected one of the plurality of wireless access nodes and exchange the modulated user communications with the selected one of the plurality of wireless access nodes.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 5 is a diagram illustrating a table of beacon signal status information.

DETAILED DESCRIPTION

Figure 1:
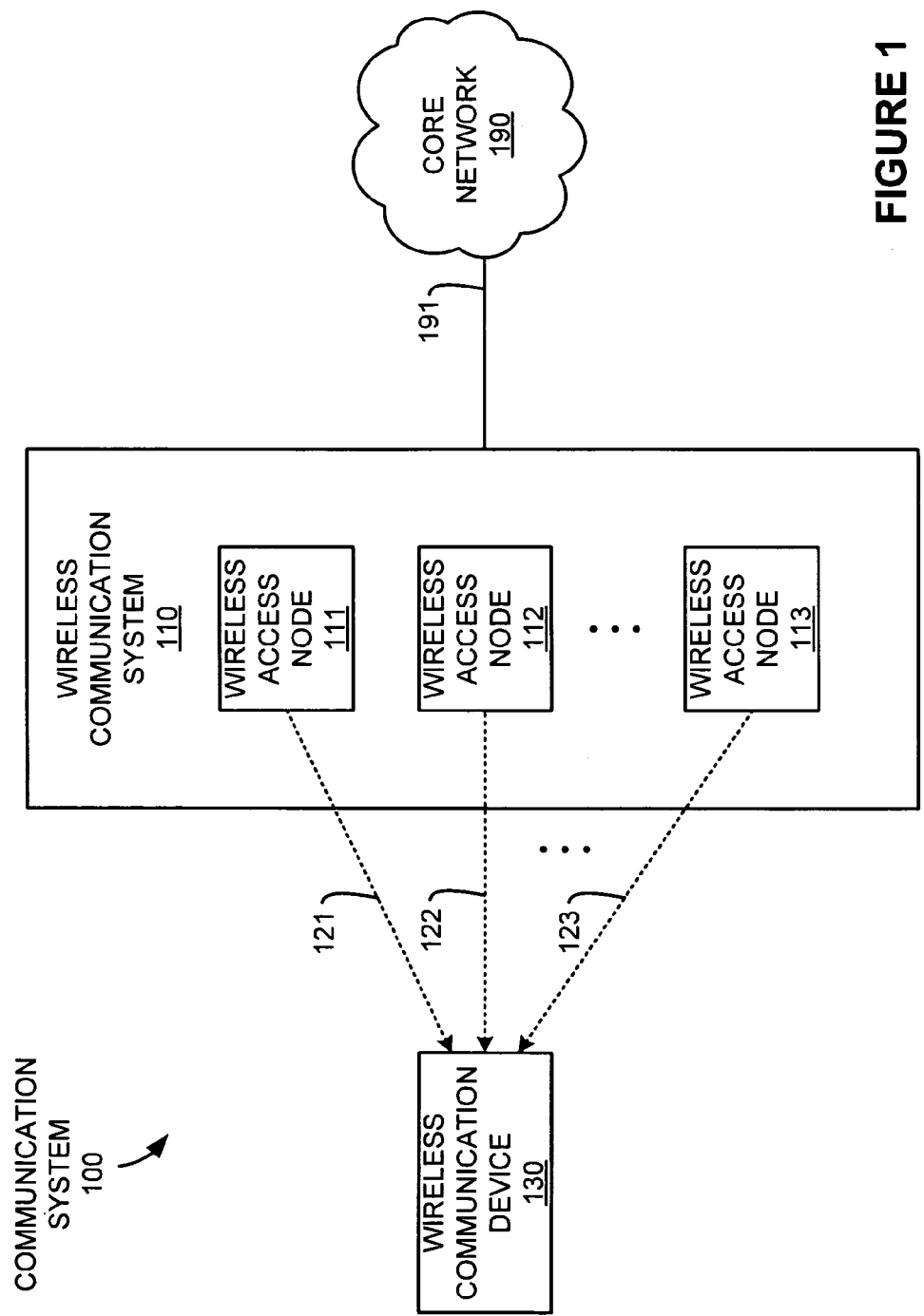
FIG. 1 is a system diagram illustrating a communication system.

FIG. 1 is a system diagram illustrating communication system 100. Communication system 100 includes wireless communication device 130, wireless communication system 110, and core network 190. Wireless communication system 110 includes wireless access nodes 111-113.

Wireless access nodes 111-113 each transmit a separate beacon signal, included in wireless links 121-123. Wireless communication device 130 can detect and monitor the beacon signals, as indicated by the arrowheads on the dashed lines representing wireless links 121-123 pointing from wireless access nodes 111-113 to wireless communication device 130. Wireless communication system 110 and core network 190 communicate over link 191.

Wireless communication device 130 comprises a telephone, transceiver, computer, digital assistant, smart phone, Internet appliance, or some other wireless communication apparatus—including combinations thereof.

Wireless access nodes 111-113 include wireless communications network equipment capable of communicating with wireless communication device 130. Examples of wireless access nodes 111-113 can include base stations, base transceiver stations, boomer stations, antennas, radio node controllers (RNC), mobile switching controllers, call processing equipment, wireless access points, Internet routers, network gateways, systems as well as other type of communication equipment—including combinations thereof. It should be understood that a different number of wireless access nodes could be included in wireless communication system 110.

Core network 190 could include an Internet network, wireless network, telephony network, optical network, enterprise network, local area network, or some other type of communication network or communication equipment—including combinations thereof.

Wireless links 121-123 use various communication media, such as air, space, or some other wireless transport media—including combinations thereof. Wireless links 121-123 use various protocols, such as code division multiple access (CDMA), worldwide interoperability for microwave access (WiMAX), universal mobile telecommunications system (UMTS), long-term evolution (LTE), wireless fidelity (WiFi), global system for mobile communications (GSM), or some other communication format—including combinations, improvements, or variations thereof.

Wireless links 121-123 may comprise many different signals sharing the same link. Wireless links 121-123 could include multiple signals operating in a single "airpath"—as represented by the dashed lines in FIG. 1—comprising beacon signals, user communications, communication sessions, frequencies, timeslots, transportation ports, logical transportation links, network sockets, packets, or communication directions. For example, the beacon signal and user communications between wireless communication device 130 and wireless access node 112 could share the same representative wireless link 122, but be transferred over different communication sessions, frequencies, timeslots, packets, ports, sockets, logical transport links, or in different directions—including combinations thereof.

Link 191 uses various communication media, such as air, space, metal, optical fiber, or some other signal propagation path—including combinations thereof. Link 191 could be wired or wireless and use various communication protocols such as Internet, Internet protocol (IP), local-area network (LAN), optical networking, hybrid fiber coax (HFC), telephony, T1, or some other communication format—including combinations or variations thereof. Link 191 could be a direct link or might include various equipment, intermediate components, systems, and networks. Link 191 could include multiple signals operating in a single pathway in a similar manner as wireless links 121-123.

Figure 2:
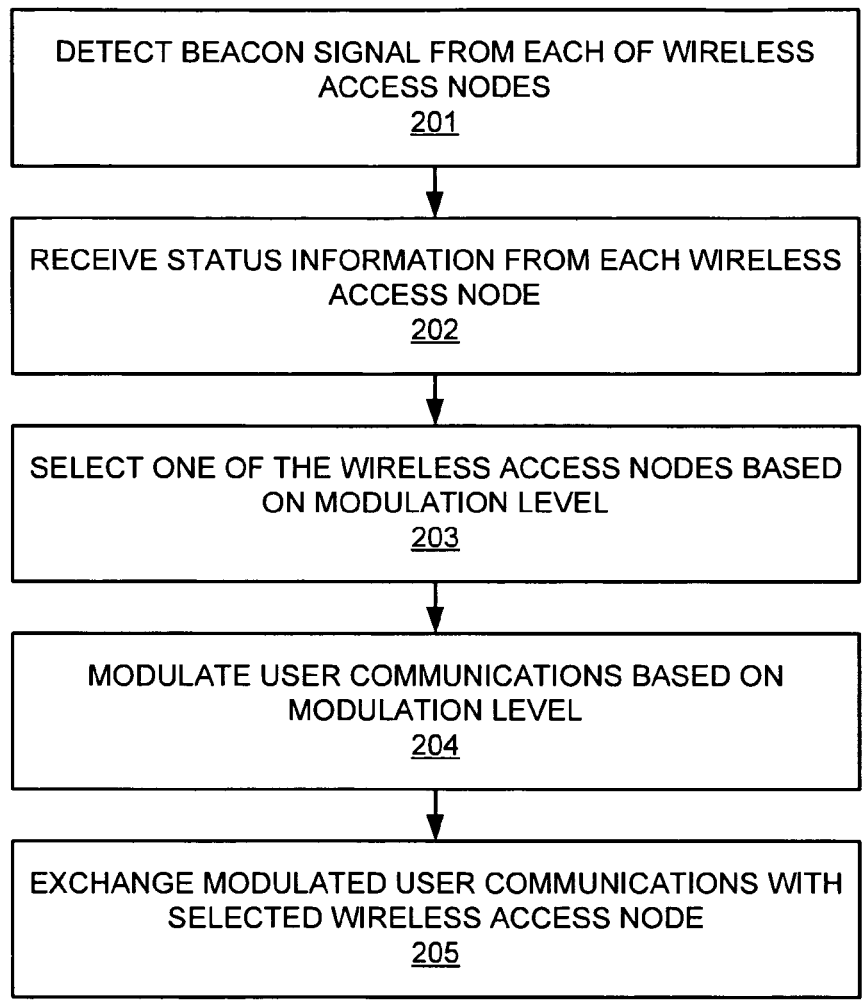
FIG. 2 is a flow diagram illustrating a method of operation of a wireless communication device.

FIG. 2 is a flow diagram that illustrates a method of operation of wireless communication device 130, as found in FIG. 1. The phases shown in FIG. 2 are indicated herein parenthetically.

In FIG. 2, wireless communication device 130 detects (201) a beacon signal from each of wireless access nodes 111-113. These beacon signals are transferred over wireless links 121-123. Each wireless access node 111-113 will have an associated beacon signal. Prior to establishing communications with wireless communication system 110, wireless communication device 130 monitors for beacon signals transmitted from access nodes 111-113.

Wireless communication device 130 also receives (202) status information from each of wireless access nodes 111-113. In some examples, the status information is received over each of the beacon signals associated with each of wireless access nodes 111-113. In other examples, wireless communication device 130, after detecting the beacon signals for each of wireless access nodes 111-113, requests or polls the status information from each of wireless access nodes 111-113.

The status information includes information relating to the status of wireless access nodes 111-113 or wireless links 121-123 associated with each wireless access node 111-113. In some examples, the status information includes a modulation level of the wireless link associated with a wireless access node. In other examples, other information could be included in the status information, such as a modulation style, a modulation order, a coding scheme, a number of forward-error correction bits employed, a number of users, a number of communication sessions, or other information, including combinations thereof. It should be understood that the status information could indicate the status of the wireless link or the associated wireless access node, or both.

Wireless communication device 130 then selects (203) one of the wireless access nodes 111-113 based on at least the modulation level associated with one of wireless links 121-123 associated with each of wireless access nodes 111-113.

The modulation level, in some examples, indicates an order of modulation within a particular modulation style. In other examples, the modulation level indicates a number of symbols, bits, constellation points, or other designators available within a particular modulation order for transferring user communications over a wireless link or with a wireless access node. Examples of a modulation style include quadrature-amplitude modulation (QAM), frequency-shift keying (FSK), phase-shift keying (PSK), and amplitude-shift keying (ASK), among others.

For example, QAM typically uses a change in phase between two or more signals to indicate a symbol, bit, or constellation point. A modulation order includes variants of the maximum number of modulation symbols available for the particular modulation style. Some example variants, or orders, within the QAM modulation style are QAM-16, QAM-64, QAM-128, and QAM-256—where the numerical value following the modulation style designator of QAM indicates the maximum number of modulation symbols available, and in this example is considered the modulation order (i.e. 16, 64, or 256).

In other examples of modulation level, each of wireless links 121-123 or wireless access nodes 111-113 may have a different number of modulation symbols available for transferring user communications due to present conditions of the wireless links or the wireless access nodes, due to a service-level agreement (SLA) of wireless communication device 130, or due to the application type of the user communications desired to be exchanged. In this example, the modulation level could also indicate a lesser number of available symbols within a specific variant, or order, of modulation style. For example, in QAM-64, the maximum number of symbols would be 64, while a reduced number symbols, perhaps 30, may be available for data transfer due to present conditions.

The modulation style, modulation order, or number of modulation symbols available for user communications can impact the data transfer rate, quality-of-service, or other factors of user communications over a particular wireless link with a particular wireless access node. Advantageously, by selecting a wireless access node based on at least modulation level, wireless communication device 130 could improve data transfer rates, enforce quality-of-service policies, conform with service-level agreements, or other factors of user communications with the selected wireless access node.

Other information regarding wireless links 121-123 or wireless access nodes 111-113 could be received by wireless access device 130, such as a coding scheme, a number of forward-error correction bits being employed, a number of users, a number of communication sessions, or other information, including combinations thereof, and considered in the determination to select a wireless access node.

Once a wireless access node has been selected, wireless communication device 130 then modulates (204) user communications based on the modulation level received. The modulation level indicates, in many examples, the method by which to modulate user communications. For example, if the modulation level is QAM-64, the user communications could be modulated according to the QAM modulation style, with an order of 64—namely 64 symbols used to encode the data in the QAM style. In other examples, the user communications could be encoded with a lesser number of symbols than the maximum available for a particular modulation order.

The modulated user communications are then exchanged (205) with the selected wireless access node over the associated wireless link. The process described in phases 201-205 could be repeated throughout user communications with a selected wireless access node upon initiation of a new communication session, due to changing conditions, or could be repeated to select another wireless access node.

Figure 3:
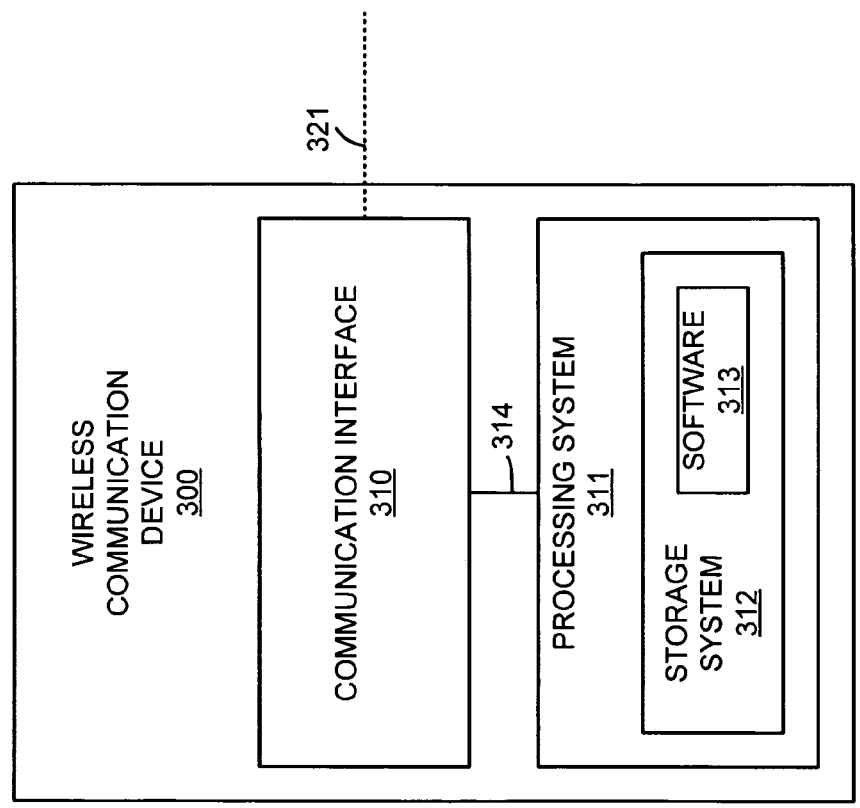
FIG. 3 is a block diagram illustrating an example of a wireless communication device.

FIG. 3 is a block diagram illustrating an example of wireless communication device 300, as an example of wireless communication device 130 found in FIG. 1, although wireless communication device 130 could use other configurations. Wireless communication device 300 includes communication interface 310 and processing system 311. Communication interface 310 and processing system 311 communicate over link 314. Communication interface 310 communicates with a wireless access node, omitted for clarity, over wireless link 321. Wireless communication device 300 may be distributed among multiple devices that together form elements 310-314.

Communication interface 310 comprises antennas, transceivers, circuitry, as well as other types of communication components—including combinations thereof.

Processing system 311 retrieves and executes software 313 from storage system 312. Processing system 311 could incorporate a computer microprocessor, logic circuit, or some other processing device, and may be distributed among multiple processing devices. In some examples, processing system 311 is located within the same equipment in which communication interface 310 is located. Storage system 312 could include a computer-readable medium such as a disk, tape, integrated circuit, server, or some other memory device, and also may be distributed among multiple memory devices. Software 313 may include an operating system, logs, utilities, drivers, networking software, and other software typically loaded onto a computer system. Software 313 could contain an application program, firmware, or some other form of computer-readable processing instructions. When executed by processing system 311, software 313 directs processing system 311 to operate as described herein.

Link 314 comprises a physical, logical, or virtual communication link, capable of communicating data, control signals, and communications, along with other information. In some examples, link 314 is encapsulated within the elements of communication interface 310 or processing system 311, and may be a software or logical link. In other examples, link 314 uses various communication media, such as air, space, metal, optical fiber, or some other signal propagation path—including combinations thereof. Link 314 could be a direct link or it might include various equipment, intermediate components, systems, and networks. Wireless link 321 could use various protocols or communication formats as described herein for wireless links 121-123—including combinations or variations thereof.

Figure 4:
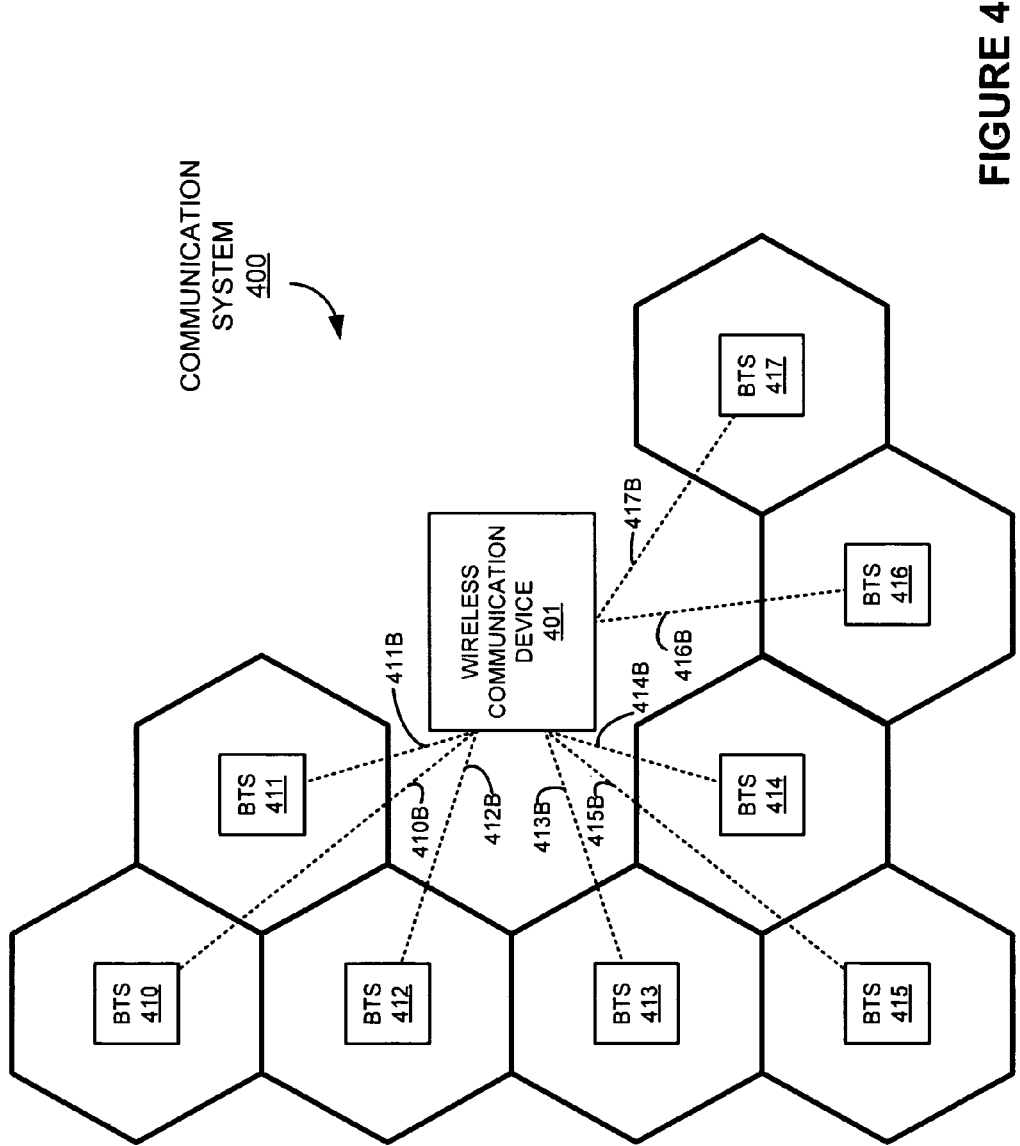
FIG. 4 is a system diagram illustrating a communication system.

FIG. 4 is a system diagram illustrating communication system 400. Communication system 400 includes wireless communication device 401 and base transceiver stations (BTS) 410-417. Wireless communication device 401, in this example, can detect beacon signals 410B-417B associated with each of BTS 410-417.

Wireless communication device 401 comprises a telephone, transceiver, computer, digital assistant, smart phone, Internet appliance, or some other wireless communication apparatus—including combinations thereof.

BTS 410-417 include base station equipment, antennas, and other equipment for communicating with and controlling wireless communication device 401. BTS 410-417 could also include other types of communications network equipment capable of communicating with wireless communication device 401.

Communication system 400 shows BTS 410-417 each situated in a separate hexagonal region of coverage, although in some examples a different number or configuration of base transceiver stations may be included. The hexagonal shape should be understood to be merely symbolic of an overhead view of a region of wireless coverage, and should not be interpreted as an exact physical representation of such region.

In many examples, a region of coverage is served by a single antenna, antenna tower, or BTS. Wireless communication devices can be located throughout the regions of coverage. Although only wireless communication device 401 is shown in FIG. 4 for clarity and simplicity, it should be understood that in various examples of communication system 400, many wireless communication devices could be located in and distributed throughout the various regions of coverage of communication system 400. Also, although wireless communication device 401 is shown outside of the various regions of coverage for clarity, it should be understood that wireless communication device 401 could be located within any region of coverage served by BTS 410-417.

FIG. 5 is a diagram illustrating table 500. Table 500 includes an example list of beacon signals detected by wireless communication device 401. The first column indicates from which BTS a beacon signal has been detected. The second column indicates which service provider is associated with the particular BTS. The third column indicates the modulation level available for the wireless link associated with the particular BTS. The fourth column indicates, for the particular coding scheme employed, the FEC redundant bits percentage (%), which in this example, indicates a number of data bits used for forward error correction (FEC) in the communications between wireless communication device 401 and the particular BTS. The fifth column indicates the beacon strength associated with each BTS beacon signal, as indicated by an RF power level of the beacon signal as determined by wireless communication device 401. For this example, a scale of 1 to 10 is used to indicate beacon strength, while in other examples a decibel reading or signal-to-noise ratio could be employed.

A coding scheme can indicate an error correction or encoding scheme to reduce data errors or add redundancy in communications. Some examples include error-correcting codes (ECC), checksums, forward-error correction (FEC), block coding, convolutional coding, and Reed-Solomon coding, among others. In many examples of FEC, redundant data bits are added into the communications to allow the recipient to validate the communications were properly received, or to aid in detection and correction of errors. The number of redundancy bits used could be varied based upon many factors, including the level of noise present on a wireless link, the RF power used to exchange communications, the distance between endpoints of a wireless link, or a signal-to-noise ration, among other factors. If a lower number of redundancy bits in the FEC coding scheme could be tolerated by wireless communication device 401, a BTS with a smaller % of redundant bits could be selected. Advantageously, this smaller % of redundant bits could free up bandwidth of the wireless link for user communications and lead to a higher data rate. A coding scheme could also, advantageously, be indicated to wireless communication device 401 prior to establishing a communication session with a BTS. In examples where reliable communications are desired, a larger FEC redundant bit % may be desired.

Figure 6:
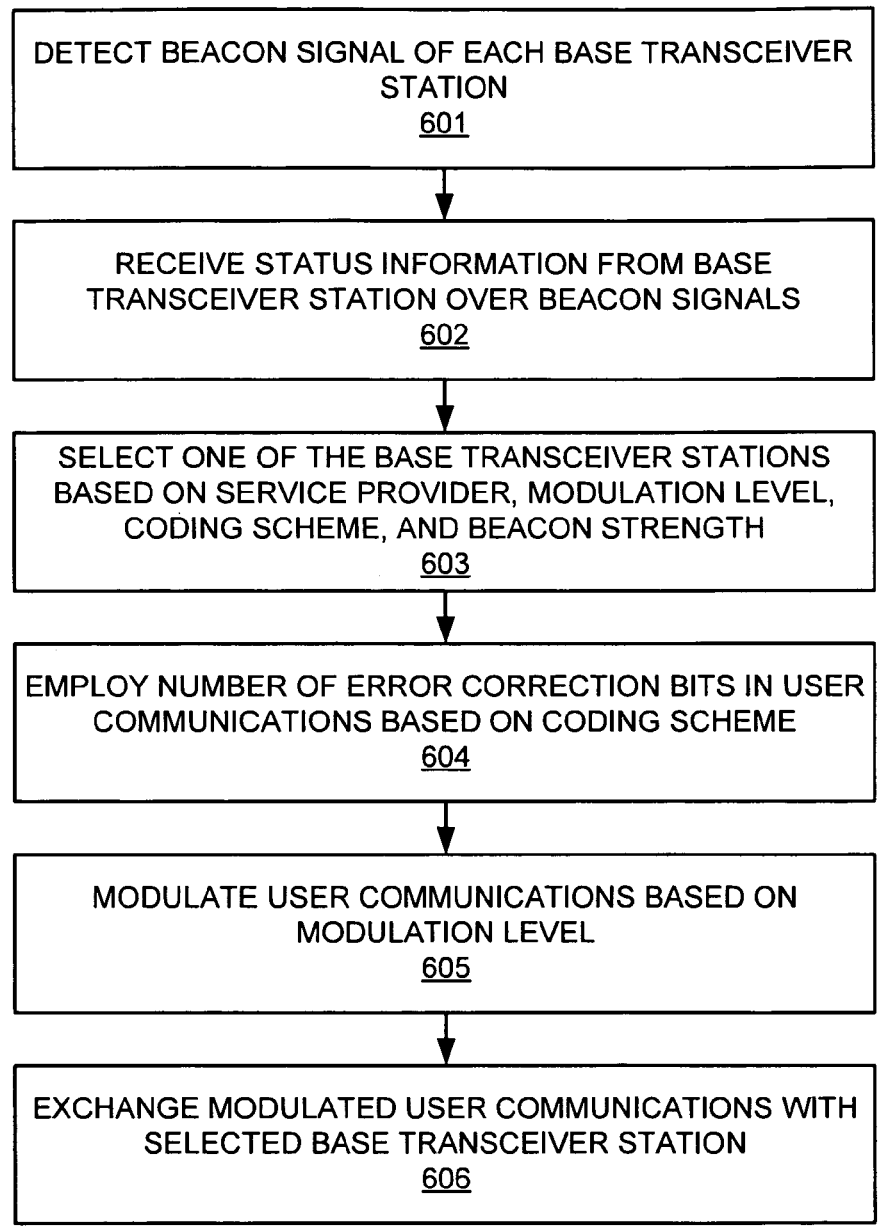
FIG. 6 is a flow diagram illustrating a method of operation of a wireless communication device.

FIG. 6 is a flow diagram that illustrates a method of operation of wireless communication device 401, as found in FIG. 4. The phases shown in FIG. 6 are indicated herein parenthetically. In FIG. 6, wireless communication device 401 detects (601) beacon signals 410B-417B from each of BTS 410-417.

In this example, wireless communication device 401 attempts to receive (602) the status information of modulation level and FEC redundant bits % over beacon signals 410B-417B associated with each of BTS 410-417. However, in this example, only certain BTS have been modified with an improved beacon signal to provide status information as described herein. Thus, modulation level and FEC redundant bits % status information is received over beacon signals 413B, 414B, 416B, and 417B from BTS 413, 414, 416, and 417. BTS 410-412, and 415, without improved beacon signals 410B-412B, and 415B, are shown in table 500 as service providers other than Sprint (as shown in the second column), and the associated columns for modulation level and FEC redundant bits % indicate a question mark (?) due to the unknown or unavailable status information.

Based on the information illustrated in table 500, wireless communication device 401 selects (603) a BTS. In this example, wireless communication device 401 selects BTS 417, as indicated by selected BTS 501 in FIG. 5. The BTS selected in this example has a modulation level of QAM-256, or 256 maximum modulation symbols, indicating a potentially higher data rate available for communications with BTS 417 than a lower order modulation (such as with QAM-64 through BTS 413), although other factors could influence the data rate, such as how noisy a wireless link may be, and the RF strength of the communications, among other factors.

For example, if wireless communication device 401 desired to exchange user communications of a certain application type with a BTS, other factors may be more important than the modulation level. To illustrate, a streaming video application may not require a high number of FEC redundant bits, but require a high data rate, and thus wireless communication device 401 could prefer a BTS with a low % of FEC redundant bits, possibly allowing more of the available bandwidth to be dedicated to video data instead of a BTS with merely a higher modulation level. In other examples, the various factors and status information such as modulation level, coding scheme, or beacon signal strength could be balanced or weighed by wireless communication device 401.

Once a BTS has been selected, wireless communication device 401 then employs (604) the number of FEC redundant bits in the user communications with the selected BTS based on the coding scheme indicated in table 500, in this example, 33% redundant bit content for selected BTS 501.

Wireless communication device 401 modulates (605) user communications based on the modulation level received, in this example, QAM-256. The modulated user communications employing the number of FEC redundant bits are then exchanged (606) with selected BTS 501 over an associated wireless link. The process described in phases 601-606 could be repeated throughout user communications with selected BTS 501, or could be repeated to select another BTS.

Figure 7:
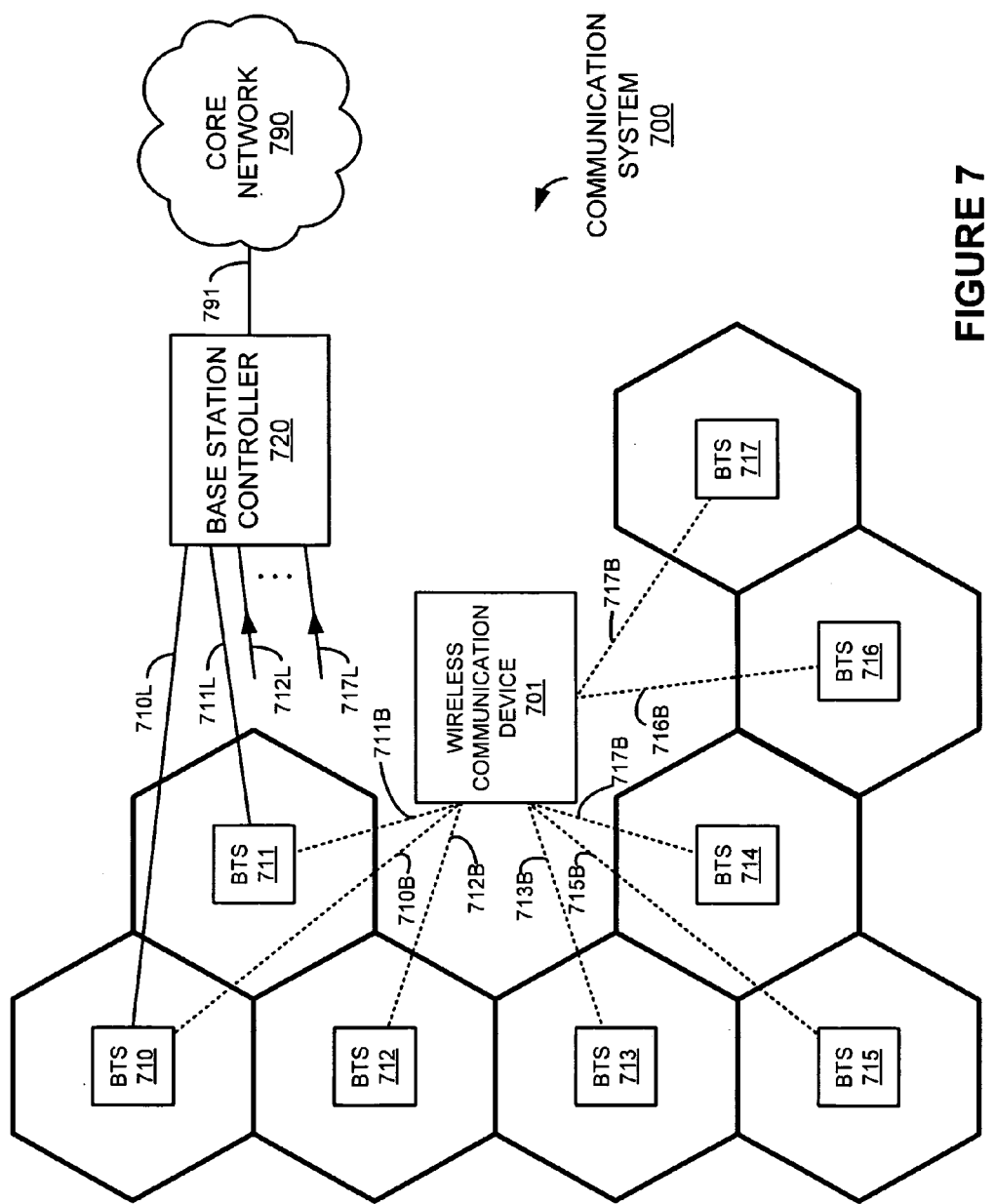
FIG. 7 is a system diagram illustrating a communication system.

FIG. 7 is a system diagram illustrating communication system 700. Communication system 700 includes wireless communication device 701, base transceiver stations (BTS) 710-717, base station controller 720, and core network 790. Wireless communication device 701, in this example, can detect beacon signals 710B-717B associated with each of BTS 710-717. Base station controller 720 and BTS 710-717 communicate over links 710L-717L, respectively. For clarity, the lines representing links 712L-717L are not shown connected to their respective BTS 712-717, but should be understood to link in a similar manner as links 710L and 711L. Base station controller 720 and core network 790 communicate over link 791.

Communication system 700 could include other equipment and elements, for example, radio node controllers (RNC), mobile switching centers (MSC), call processing systems, authentication, authorization and accounting (AAA) equipment, as well as other equipment—including combinations thereof.

Wireless communication device 701 comprises smart phone in this example. BTS 710-717 comprise base transceiver station equipment in this example, and further include an antenna and antenna tower. Base station controller 720 is configured to monitor and control the operations of BTS 710-717—in this example, BTS 710-717 are operated by the same service provider as base station controller 720. Core network 790 includes a core network of the service provider in this example, comprising an Internet network, local area networks, and other telecommunications equipment and networks. Links 710L-717L each comprise T1 connections, and link 791 comprises an optical networking connection in this example.

Communication system 700 shows BTS 710-717 each situated in a separate hexagonal region of coverage, although in some examples a different number or configuration of base transceiver stations may be included. The hexagonal shape should be understood to be merely representative of an overhead view of a region of wireless coverage, and should not be interpreted as an exact physical representation of such region.

Also in this example, each region of coverage is served by a single antenna tower and BTS. Wireless communication devices can be located throughout the regions of coverage. Although only wireless communication device 701 is shown in FIG. 7 for clarity and simplicity, it should be understood that in various examples of communication system 700, many wireless communication devices could be located in and distributed throughout the various regions of coverage of communication system 700. Also, although wireless communication device 701 is shown outside of the various regions of coverage for clarity, it should be understood that wireless communication device 701 could be located within any region of coverage served by BTS 710-717.

Figure 8:
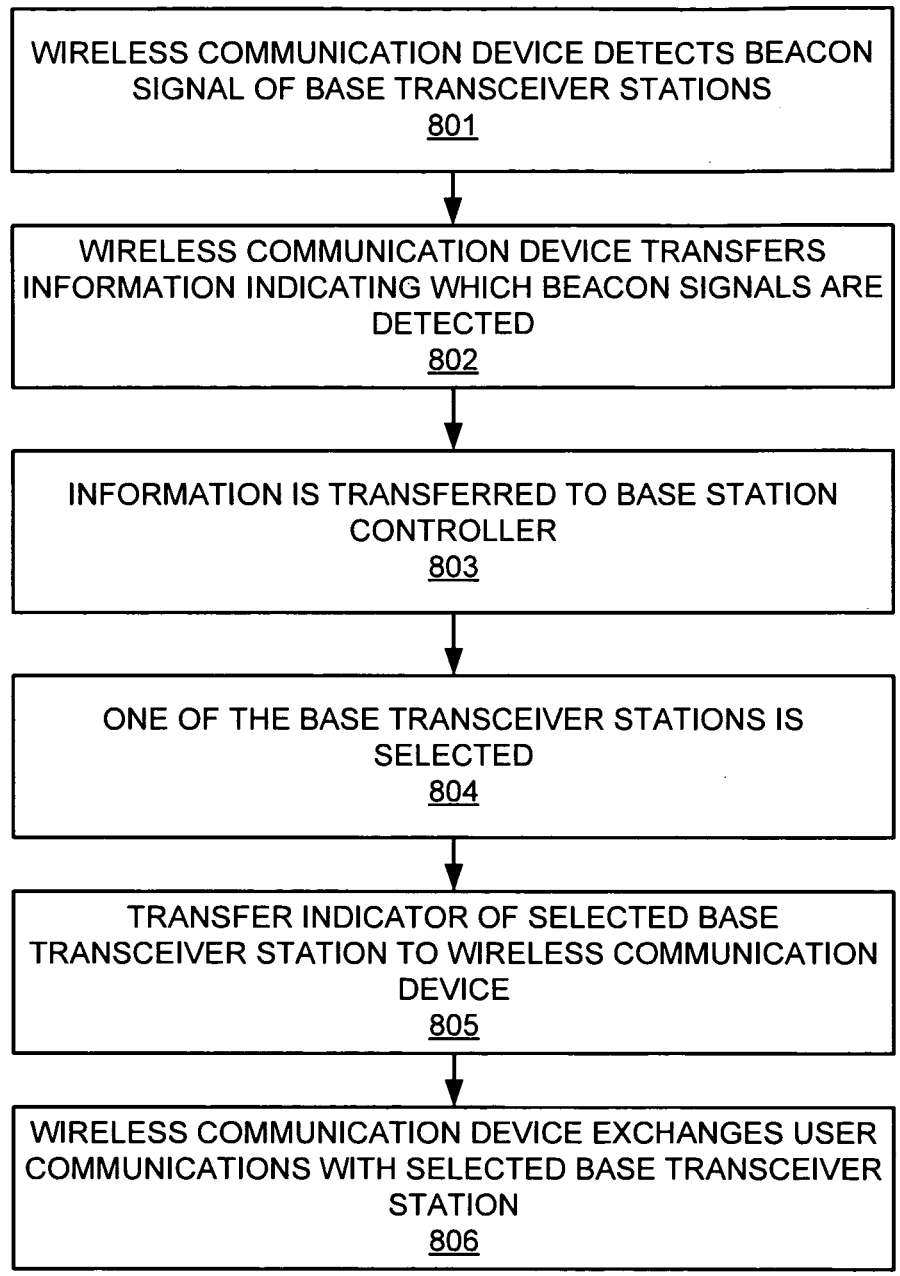
FIG. 8 is a flow diagram illustrating a method of operation of a communication system.

FIG. 8 is a flow diagram that illustrates a method of operation of communication system 700, as found in FIG. 7. The phases shown in FIG. 8 are indicated herein parenthetically. In FIG. 8, wireless communication device 701 detects (801) beacon signals 710B-717B from each of BTS 710-717.

Wireless communication device 701 then transfers (802) information indicating which beacon signals have been detected. The information could be transferred to any one of BTS 710-717. In some examples the information could be transferred to the BTS with the highest RF signal strength of the beacon signal, or other factors could be considered. In addition to the information indicating which beacon signals have been detected, wireless communication device 701 could also transfer information relating to the signal strength of each beacon detected as determined by wireless communication device 701. In further examples, wireless communication device 701 transfers an application type for the communication session that wireless communication device 701 desires to initiate.

An application type comprises a user service or user communications as implemented in communication packets transferred between wireless communication device 701 and the selected BTS or core network 790. The user services, for example, could include Internet communications, voice calls, telephony, video, audio, email, text, chat data, web pages, peer-to-peer (P2P) communications, Voice over IP (VoIP), as well as other data and application types—including combinations thereof. The application could also be distinguished among different application service providers, even though such application service providers are providing similar types of user services. For example, although Voice over IP (VoIP) is a type of user service, various application service providers, could also be distinguished from each other, much like the individual user services.

The BTS that receives the information transferred by wireless communication device 701 further transfers (803) the information to base station controller 720, over the link 710L-717L, the particular link corresponding to the particular BTS that originally received the information.

Base station controller 720 receives this information and selects (804) one of the BTS. This selection could be determined based on many factors, including the beacon signal strength as determined by wireless communication device 701, the particular base transceiver stations detected, a service-level agreement (SLA) of wireless communication device 701, the application type, geographic considerations, traffic loading of each of BTS, or other considerations, including combinations thereof. For example, a particular BTS may have a certain modulation level available for communication with wireless communication device 701. Since wireless communication device 701 desires to initiate a communication session of a particular application type, the BTS best suited to the application type based on the modulation level, coding scheme, or other factors could be selected. In other examples, the SLA of wireless communication device 701 could be considered where the user of wireless communication device 701 has paid for a certain bandwidth and a BTS is selected which is able to conform to the SLA. In some examples, base station controller further transfers the information to other equipment or systems which subsequently select a particular BTS, possibly to core network 790 over link 791.

Once the particular BTS has been selected, base station controller 720 transfers (805) an indicator of the selected BTS to wireless communication device 701. In some examples, the indicator is transferred through the same BTS that wireless communication device 701 originally transferred the detected beacon signal information, while in other examples, the indicator could be transferred through a different BTS.

Wireless communication device 701 receives this indicator of a selected BTS and exchanges (806) user communications with the selected BTS, as determined by base station controller 720. In further examples, once a BTS has been selected, wireless communication device 701 could then modulate the user communications based on a modulation level received, or implement a coding scheme or error correction on the user communications, and further transfer user communications to core network 790 over link 791 through the selected BTS.

FIGS. 1-8 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device, the method comprising:
   detecting a plurality of beacon signals, wherein each of the plurality of beacon signals is associated with each of a plurality of wireless access nodes;
   receiving status information from each of the plurality of wireless access nodes, wherein the status information comprises a modulation level of a wireless link associated with each of the plurality of wireless access nodes;
   determining an application type associated with user communications to be exchanged through the wireless communication device;
   selecting one of the plurality of access nodes based on the modulation level of the wireless link associated with each of the plurality of wireless access nodes suited for the application type;
   modulating the user communications based on the modulation level of the wireless link associated with the one of the plurality of wireless access nodes; and
   exchanging the modulated user communications with the one of the plurality of wireless access nodes.

2. The method of operating the wireless communication device of claim 1, wherein receiving the status information from each of the plurality of wireless access nodes comprises receiving the status information from each of the plurality of beacon signals.

3. The method of operating the wireless communication device of claim 1, further comprising:
   requesting the status information from each of the plurality of wireless access nodes.

4. The method of operating the wireless communication device of claim 1, wherein the status information from each of the plurality of wireless access nodes further comprises a coding scheme of the wireless link associated with each of the plurality of wireless access nodes.

5. The method of operating the wireless communication device of claim 4, wherein the coding scheme of the wireless link associated with each of the plurality of wireless access nodes comprises a forward-error correction coding scheme.

6. The method of operating the wireless communication device of claim 1, wherein the status information from each of the plurality of wireless access nodes further comprises a number of users associated with each of the plurality of wireless access nodes.

7. The method of operating the wireless communication device of claim 1, wherein selecting the one of the plurality of wireless access nodes comprises processing the modulation level of the wireless link associated with each of the plurality of wireless access nodes and the application type associated with the user communications to select the one of the plurality of wireless access nodes based on the modulation level suited for the application type associated with the user communications.

8. The method of operating the wireless communication device of claim 1, wherein selecting the one of the plurality of wireless access nodes comprises processing the modulation level of the wireless link associated with each of the plurality of wireless access nodes, a coding scheme of the wireless link associated with each of the plurality of wireless access nodes, the application type associated with the user communications, and a signal strength of each of the plurality of beacon signals to select the one of the plurality of wireless access nodes based on the modulation level, coding scheme, and signal strength suited for the application type associated with the user communications.

9. The method of operating the wireless communication device of claim 1, wherein the modulation level of the wireless link associated with each of the plurality of wireless access nodes corresponds to a presently available number of usable symbols less than a maximum number of usable symbols in a style of modulation.

10. The method of operating the wireless communication device of claim 1, wherein the modulation level of the wireless link associated with each of the plurality of wireless access nodes corresponds to an order of a quadrature amplitude modulation.

11. A wireless communication device, comprising:
a communication interface configured to detect a plurality of beacon signals, wherein each of the plurality of beacon signals is associated with each of a plurality of wireless access nodes;
the communication interface configured to receive status information from each of the plurality of wireless access nodes, wherein the status information comprises a modulation level of a wireless link associated with each of the plurality of wireless access nodes;
a processing system configured to determine an application type associated with user communications to be exchanged through the wireless communication device, select one of the plurality of access nodes based on the modulation level of the wireless link associated with each of the plurality of wireless access nodes suited for the application type;
the communication interface configured to modulate the user communications based on the modulation level of the wireless link associated with the one of the plurality of wireless access nodes; and
the communication interface configured to exchange the modulated user communications with the one of the plurality of wireless access nodes.

12. The wireless communication device of claim 11, comprising:
the communication interface configured to receive the status information from each of the plurality of beacon signals.

13. The wireless communication device of claim 11, further comprising:
the communication interface configured to request the status information from each of the plurality of wireless access nodes.

14. The wireless communication device of claim 11, wherein the status information from each of the plurality of wireless access nodes further comprises a coding scheme of the wireless link associated with each of the plurality of wireless access nodes.

15. The method of operating the wireless communication device of claim 14, wherein the coding scheme of the wireless link associated with each of the plurality of wireless access nodes comprises a forward-error correction coding scheme.

16. The wireless communication device of claim 11, wherein the status information from each of the plurality of wireless access nodes further comprises a number of users associated with each of the plurality of wireless access nodes.

17. The wireless communication device of claim 11, wherein the processing system is configured to process the modulation level of the wireless link associated with each of the plurality of wireless access nodes and the application type associated with the user communications to select the one of the plurality of wireless access nodes based on the modulation level suited for the application type associated with the user communications.

18. The wireless communication device of claim 11, wherein the status information from each of the plurality of wireless access nodes further comprises a coding scheme of the wireless link associated with each of the plurality of wireless access nodes, and wherein the processing system is configured to process the modulation level of the wireless link associated with each of the plurality of wireless access nodes, the coding scheme of the wireless link associated with each of the plurality of wireless access nodes, the application type associated with the user communications, and a signal strength of each of the plurality of beacon signals to select the one of the plurality of wireless access nodes based on the modulation level, the coding scheme, and the signal strength suited for the application type associated with the user communications.

19. The wireless communication device of claim 11, wherein the modulation level of the wireless link associated with each of the plurality of wireless access nodes corresponds to a presently available number of usable bits in a style of modulation less than a maximum number of usable symbols.

20. The wireless communication device of claim 11, wherein the modulation level of the wireless link associated with each of the plurality of wireless access nodes corresponds to an order of a quadrature amplitude modulation.

* * * * *